(12) United States Patent
Pawlyk

(10) Patent No.: US 12,235,189 B2
(45) Date of Patent: Feb. 25, 2025

(54) METHOD AND APPARATUS FOR TESTING FOR LEAKS IN A CONTAINED SYSTEM USING AN UNMANNED AERIAL VEHICLE

(71) Applicant: Richard A. Pawlyk, St. Albert (CA)

(72) Inventor: Richard A. Pawlyk, St. Albert (CA)

( * ) Notice: Subject to any disclaimer, the term of this patent is extended or adjusted under 35 U.S.C. 154(b) by 359 days.

(21) Appl. No.: 16/811,501

(22) Filed: Mar. 6, 2020

(65) Prior Publication Data

US 2021/0231518 A1 Jul. 29, 2021

(30) Foreign Application Priority Data

Jan. 28, 2020 (CA) ................. CA 3070138

(51) Int. Cl.
*G01M 3/22* (2006.01)
*G05D 1/00* (2024.01)

(52) U.S. Cl.
CPC .......... *G01M 3/222* (2013.01); *G05D 1/0094* (2013.01); *G05D 1/101* (2013.01)

(58) Field of Classification Search
CPC ...... G01M 3/222; G01M 3/20; G05D 1/0094; G05D 1/101
See application file for complete search history.

(56) References Cited

U.S. PATENT DOCUMENTS

| | | | |
|---|---|---|---|
| 4,709,577 A | 12/1987 | Thompson | |
| 5,404,763 A * | 4/1995 | Guggenheim | G01N 1/26 73/863.31 |
| 5,767,390 A | 6/1998 | Chapman, IV | |
| 6,125,710 A * | 10/2000 | Sharp | G01N 1/26 73/864.81 |
| 7,704,746 B1 * | 4/2010 | White | G01M 3/20 436/56 |
| 7,905,132 B1 * | 3/2011 | Chamberlain | G01M 3/205 73/40.7 |
| 8,820,672 B2 | 9/2014 | Erben et al. | |
| 2017/0138732 A1 * | 5/2017 | Pettersson | G01C 11/00 |
| 2021/0283597 A1 * | 9/2021 | Kluge | B01L 3/5023 |

FOREIGN PATENT DOCUMENTS

| | | |
|---|---|---|
| CA | 2714125 | 2/2012 |
| WO | 2016185467 | 11/2016 |

OTHER PUBLICATIONS

Downloaded from www.technologyreview.com: Intelligent Machines: Drones That Can Suck up Water Hunt Oil Leaks, Invasive Species; Mar. 13, 2017; p. 1-6.
Pamphlet from Markes International: MTS-32; Multi-Tube Sequential Sampler; Jun. 9, 2020; p. 1-2.
Downloaded from: www.skiesmag.com/news/pegasus-imagery-imagining-a-smarter-future; Pegasus Imagery: Imagning a Smarter Future; Posted on Nov. 21, 2019 by Tania Moffat; p. 1.

* cited by examiner

*Primary Examiner* — Nasim N Nirjhar
(74) *Attorney, Agent, or Firm* — Pedersen and Company, PLLC; Ken J. Pedersen; Barbara S. Pedersen

(57) ABSTRACT

There is an apparatus and method of testing for leaks in a contained system with an interior containing fluids. A tracer gas is introduced into the interior of the contained system. The apparatus and method sense for the presence of the tracer gas outside the contained system using a plurality of sensors located on an unmanned aerial vehicle.

12 Claims, 3 Drawing Sheets

METHOD AND APPARATUS FOR TESTING FOR LEAKS IN A CONTAINED SYSTEM USING AN UNMANNED AERIAL VEHICLE

TECHNICAL FIELD

This document relates to methods and apparatuses for testing for leaks in a contained system using an unmanned aerial vehicle.

BACKGROUND

Leak detection systems incorporate the injection of tracer fluid into a tank and the use of sensors outside the tank to detect for the presence of leaked tracer. Many detection systems require that operating fluid be first removed entirely from the tank, resulting in downtime and cost to the tank operator. Some detection systems are able to work while operating fluid is present and the tank is in operation, for example the systems disclosed in U.S. Pat. Nos. 5,767,390, and 4,709,577. However, such systems usually require a mixing device for dispersing tracer gas uniformly throughout the fluid and have lengthy response times. Leak detection systems may incorporate permanent cable sensors along a length of a pipeline or underground tank that allow fluid diffusion along the length of the cable for detection of leaks. Still other leak detection systems may need to be permanently or semi-permanently installed outside of the contained system.

Various leak detection systems that require modifications to pipelines or tanks, or rely on detection systems that are permanently or semi-permanently installed outside of a contained system in order to detect leaks may be difficult to install and costly to service, particularly in remote locations or locations with difficult terrain. Mobile detection systems such as using a person carrying sensing equipment either by walking or in a ground vehicle may be costly, time consuming, dangerous or impractical in remote locations or locations with difficult terrain.

SUMMARY

In an embodiment there is disclosed a method of testing for leaks in a contained system with an interior containing fluids. A tracer gas is introduced into the interior. The presence of the tracer gas is sensed outside the contained system using a plurality of sensors located on an unmanned aerial vehicle.

In various embodiments, there may be included any one or more of the following features: the plurality of sensors are a plurality of tubes, each tube containing an absorbent material which is capable of absorbing the tracer gas; the plurality of tubes are opened sequentially as the plurality of sensors are transported on the unmanned aerial vehicle; a vacuum pump for drawing air through each of the plurality of tubes sequentially; the unmanned aerial vehicle includes a radio navigation service receiver; a funnel scoop for drawing air through each of the plurality of tubes; the funnel scoop has a width and a height and the funnel scoop is elongated with the width being greater than the height; and the contained system is a pipeline.

There is also disclosed in another embodiment a leak detection apparatus for a contained system, including an unmanned aerial vehicle, a sequential sampling tracer unit containing a plurality of tubes mounted on the unmanned aerial vehicle, and in which the plurality of tubes include an absorbent material which is capable of absorbing the tracer gas.

In various embodiments, there may be included any one or more of the following features: a vacuum pump for drawing air through each of the plurality of tubes sequentially; a funnel scoop for drawing air through each of the plurality of tubes; the funnel scoop has a width and a height and the funnel scoop is elongated with the width being greater than the height; and a radio navigation service receiver mounted on the unmanned aerial vehicle.

These and other aspects of the device and method are set out in the claims, which are incorporated here by reference.

BRIEF DESCRIPTION OF THE DRAWINGS

Embodiments will now be described with reference to the figures, in which like reference characters denote like elements, by way of example, and in which.

DETAILED DESCRIPTION

Figure 1:
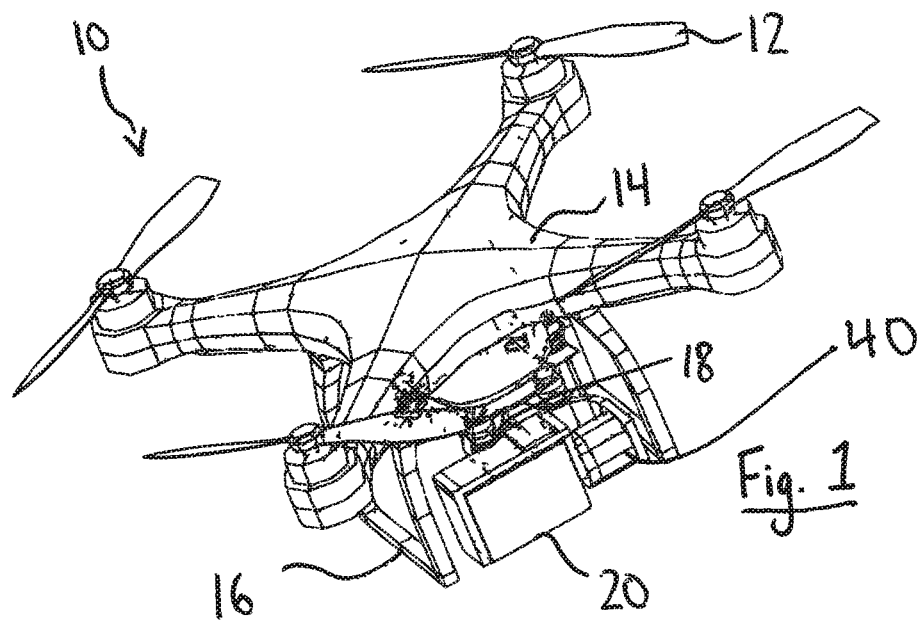
FIG. 1 is a perspective view of an unmanned aerial vehicle carrying a sequential sampling tracer unit.

Immaterial modifications may be made to the embodiments described here without departing from what is covered by the claims. The figures are not drawn to scale, and other components not mentioned may be present in order to allow the disclosed methods to be carried out.

Changing legislation, evolving technologies, environmental awareness, and aging infrastructure have all challenged companies to assess exposure to the potentially damaging environmental, public relations, and financial risks caused by undetected leaks in petroleum storage facilities and associated piping. Thus, integrity testing of for example underground storage tanks (USTs) and aboveground storage tanks (ASTs) has become a lucrative market. Various systems and methods for leak testing of storage tanks and pipelines, often used for petroleum crude or refined-product storage and transport, have been introduced to meet this need. One method to detect leaks in these vessels and pipelines involves adding a quantifiable tagging agent such as a specialty compound or mixture (called a "tracer") to the product being stored or moved that is both soluble in the product and not ordinarily present in the product or in the environment. Subsequent detection of this tracer compound or mixture outside the vessel or pipeline system can demonstrate that the tracer mixture has escaped the system, thereby indicating the system has developed a leak.

An example method of using tracers to test for leaks in a contained system is disclosed in Canadian Patent No. 2,714,125. Various perfluorohydrocarbons may be used as tracers, including perfluorodimethylcyclohexane. For example, perfluorocarbon tracers may be obtained from companies such as Synquest Labs or F2 Chemicals. In some embodiments, the tracers may be detectable in the parts per quadrillion. The tracers can be placed within the contained system, such as a storage vessel or piping, and may be detected at points where there are leaks in the system. In this patent document, the term "contained system" is used to describe any system that is designed to separate substances from the environment. For example, a contained system could be a storage tank, a pipeline, or a liner of a settling pond. The contained system may be, but need not be, pressurized. Different tracers may be used depending on the specific contained system and the type of leaks that are anticipated. In some cases, tracers may be introduced at or near a contained system, such as below a liner of a settling pond, and the tracers may be detected in the environment above the settling pond. If there is a leak, then the tracers will pass through the liner into the interior of the contained system and then into the environment, where it may be detected. The reference to "fluids" describes any type of liquid or gaseous products or any combination of the two, and may include products with entrained particles or other solids within the fluid mixtures including any substance that may flow or otherwise act like a fluid.

The tracers may be delivered into the contained system by various means, such as those described in Canadian Patent No. 2,714,125. Tracers may also be delivered into the contained system by methods that attempt to reduce potential contamination of tracers into the environment, such as by delivering the tracers into the interiors of the contained systems in a form that does not release the tracers during transportation, such as using breakable liquid caps, gel capsules or supplying the tracers within dry ice.

FIGS. 1 to 4 show an embodiment of a leak detecting apparatus which may be used to implement a method of detecting leaks in a contained system by sensing for the presence of the tracer gas outside a contained system using a plurality of sensors located on an unmanned aerial vehicle.

As shown in FIG. 1, there is an unmanned aerial vehicle 10, or drone, having propellers 12, a body 14, a landing frame 16 and a support structure 18 which holds a sequential sampling tracer unit 20. The sequential sampling tracer unit 20 may be attached to or lifted by the unmanned aerial vehicle in various different ways, so long as the sequential sampling tracer unit 20 may be transported by the unmanned aerial vehicle 10. A radio navigation service receiver 40, such as a GPS receiver may be mounted on the unmanned aerial vehicle 10. The radio navigation service receiver 40 may be mounted directly on the unmanned aerial vehicle 10 or indirectly, for example, by including the radio navigation service receiver 40 within or on the sequential sampling tracer unit 20.

In an embodiment there is a method of testing for leaks in a contained system 42 with an interior containing fluids, which may be at an operating pressure. In an embodiment, the unmanned aerial vehicle 10 may be a drone made by Nord Drones from Norway. The size of unmanned aerial vehicle may be determined by the location to be surveyed. For example, larger drones with longer travel distance capability and longer battery life may be preferable for detecting leaks in lengthy pipelines in isolated and difficult terrain.

Figure 2:
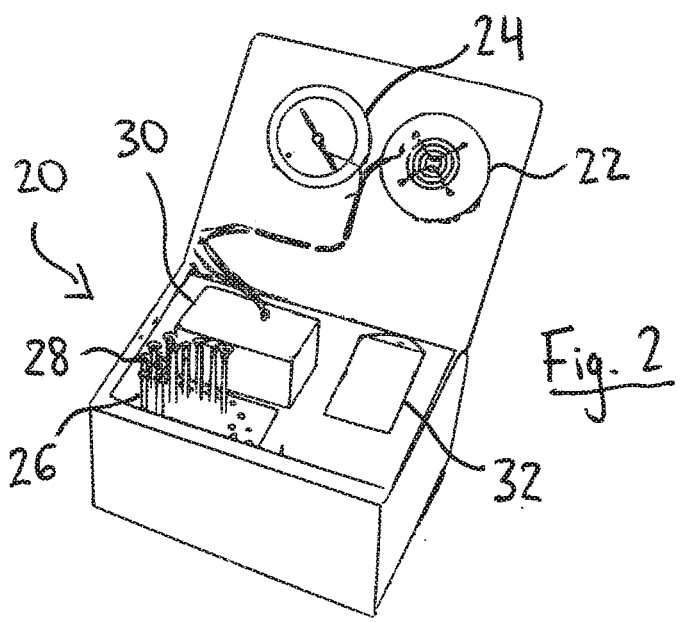
FIG. 2 is a partial perspective view of an embodiment of a sequential sampling tracer unit.
Figure 3:
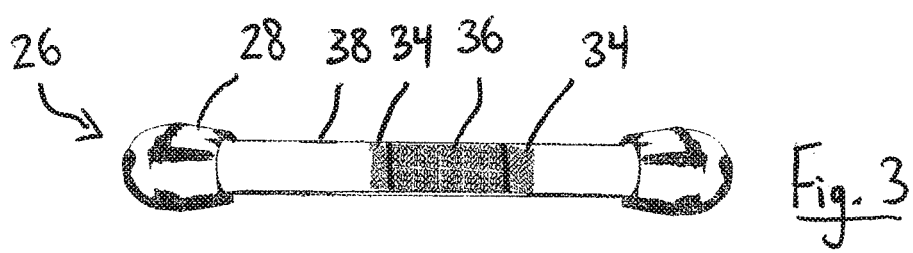
FIG. 3 is a perspective view of a sampling tube.

An embodiment of the sequential sampling tracer unit 20 is shown in FIG. 2. A motor 24 rotates each of a plurality of sensors 26 sequentially into an open position. As shown in FIG. 3, the sensors may be a plurality of tubes 26, with each tube 26 including caps 28 on each end of a hollow tube 38, a filter 34 within the hollow tube 38 on each end of an absorbent material 36 which is capable of absorbing tracer gas. For simplicity of presentation, only a portion of the total potential number of plurality of tubes 26 are shown in FIG. 26. The tubes 26 may be placed in a full ring of tubes which can be rotated by the motor 24. There may be a vacuum pump 22 in the tracer unit 20 for drawing air through each of the plurality of tubes sequentially.

The sequential sampling tracer unit 20 causes each of the tubes 26 to be rotated using the motor 24 into an open position where the caps 28 of the tube 26 may be removed in order for the absorbent material 36 to be exposed to the environment. For example, the tubes may have caps that are designed to slide inside grooves on either side of the tubes within the tracer unit 20, in which the grooves are farther apart from each other at the location where the tubes are to be opened, thereby removing the caps 28 from the hollow tubes 38 when the tubes slide into the open position. Various other methods of opening and closing the hollow tubes 38 may be used.

When opened, each tube 26 may be left in an open position for a set period of time, such as two minutes, after which the tube is closed by securing both caps 28 and the next sequential tube 26 is opened using the same process. Each of the tubes in the sequential sampling tracer unit may be opened in sequential order until each of the tubes 26 have been opened. The tubes 26 may be opened in any order and for any length of time, so long as usable information about the location of the leak can be determined based on the location of the unmanned aerial vehicle 10 at the time the respective tube 26 was opened. A control unit 30 may control the motor 24 and the vacuum pump 22. A battery 32 may be used to power the tracer unit 20, although in other embodiments power from the battery of the drone 10 or other power source may be used.

For example, the sequential sampling tracer unit 20 may be an MTS-32™ multi-tube sequential sampler made by Markes International modified to operate with tracer tubes 26.

In some cases, sampling may be done only periodically and there may be a delay between when one tube is closed and the next sequential tube is opened. The sequence in which the tubes are opened and the location that the tubes are opened should be tracked in some manner. For example, in some embodiments a processor may be used to record information about where the unmanned aerial vehicle 10 is at the time when each of the tubes are opened in sequence. This information may be used to determine a location of a leak within an area range. For example, if the tubes are opened for two minutes, and a tracer is detected in one of the tubes, then the location of the leak may be determined to be in an area close to the location that the unmanned aerial vehicle 10 had travelled during the two minutes that the tube was open. Where pinpoint accuracy of the location of a leak is desired, the unmanned aerial vehicle 10 may be sent to the general location of the original identified leak to do further measurements to determine the specific location of the leak. In other embodiments, more accurate location information can be determined using additional tracers collected by one or more methods including a person walking near the location with a sensor, placing a stationary ground collection unit at the location, or a ground vehicle going to the location with a sensor. In some cases, multiple passes of location information may be collected each with increasingly precise information until the leak can be detected to a desired level of precision.

In some embodiments, only sampling, and not analysis, may be conducted on the unmanned aerial vehicle 10. Additional analysis may be conducted once the drone has completed a flight across a section in proximity to the contained system being tested. Different numbers of tubes may be used for different applications. In some applications, additional tubes may need to be reloaded on the unmanned aerial unit 10 during testing, particularly in cases where lengthy sections of pipelines need to be tested. Additional analysis may be conducted using information collected regarding ground tortuosity, which may be used to determine the size of the leak based on an estimation of the amount of tracer that should exit the ground based on modeling of different sizes of leaks.

The method may be used to detect leaks in many applications, including, for example, contained systems such as pipelines in either the oil and gas industry or for sewage or water systems.

Figure 4:
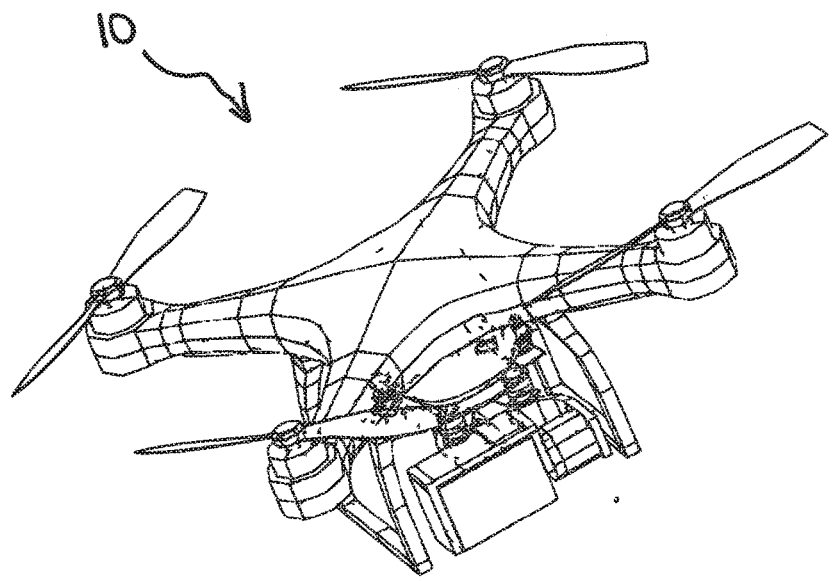
FIG. 4 is a simplified view of an unmanned aerial vehicle above a pipeline.
Figure 4:
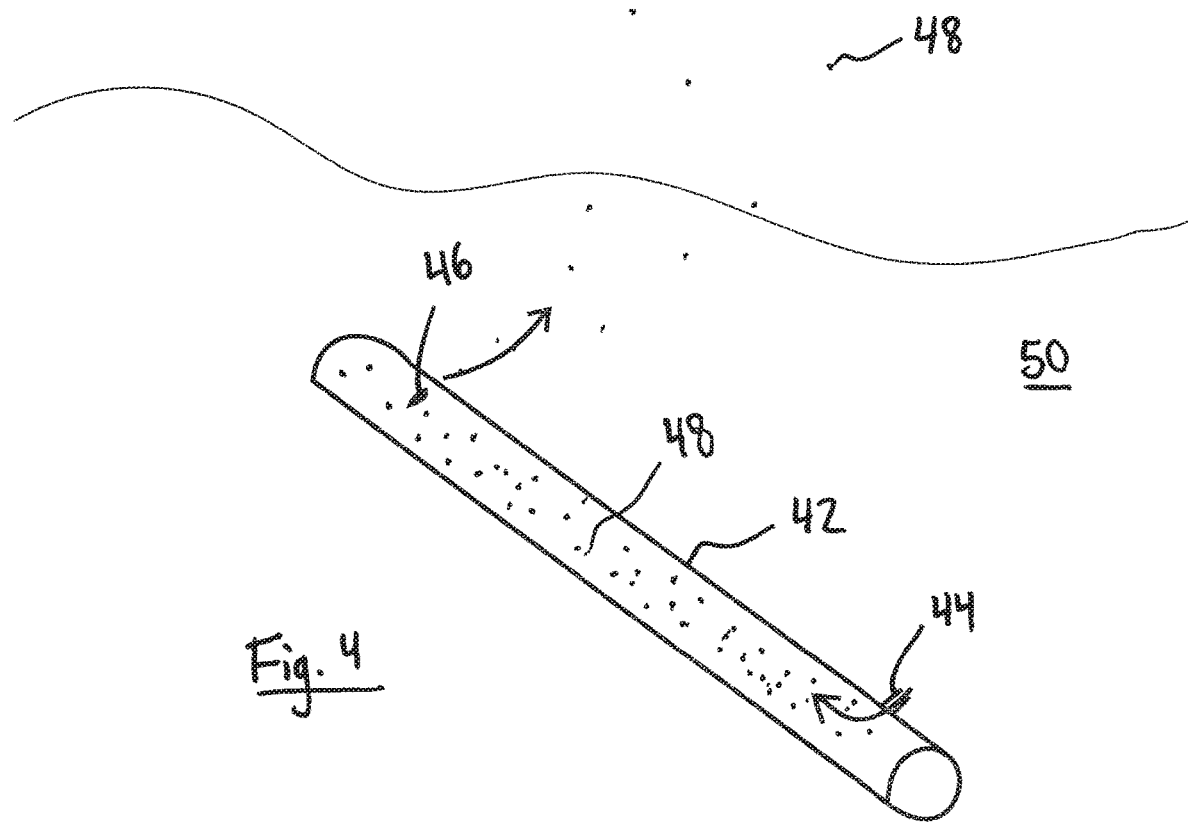

As shown in FIG. 4, the contained system may be a pipeline 42. A tracer gas 48 may be introduced into the interior of the pipeline 42 at an inlet 44. Various types of inlets 44 may be used to introduce tracer. Preferably, the tracer can be introduced into the system without interfering with fluid flow or pressure within the contained system. The pipeline 42 may be above ground 50, as shown in FIG. 4, or below ground, or a combination of the two. The inlet 44 should be upstream of or at the location where leaks are to be detected. In a system where a tank is being tested for leaks, the tracer should be introduced at a location where it will spread throughout the tank. If there is a leak in the contained system, as shown for example as a hole 46, the tracer 48 will exit the system and can be detected by the sensors 26 (FIG. 2) on the unmanned aerial vehicle 10.

In some embodiments of the method, the method may be used to detect leaks in pipelines, utility lines, ASTs, USTs, and underground infrastructure. The use of an unmanned aerial vehicle may be particularly suited for remote or inaccessible areas using data collected by the drone.

In some embodiments, testing may be non-intrusive and require no facility downtime. In some embodiments, tracers may be used to identify leaks underground with pinpoint accuracy, which may reduce and avoid costly dig-ups and uncertainty.

As shown in FIG. 2, the sequential sampling tracer unit 20 has an onboard vacuum pump 22 to introduce air into the unit. However, in other embodiments, air may be directed into the tubes 26 using a snorkel mounted on the unmanned aerial vehicle 10 or using downdraft from the propellers 12 of the unmanned aerial vehicle 10.

Figure 5:
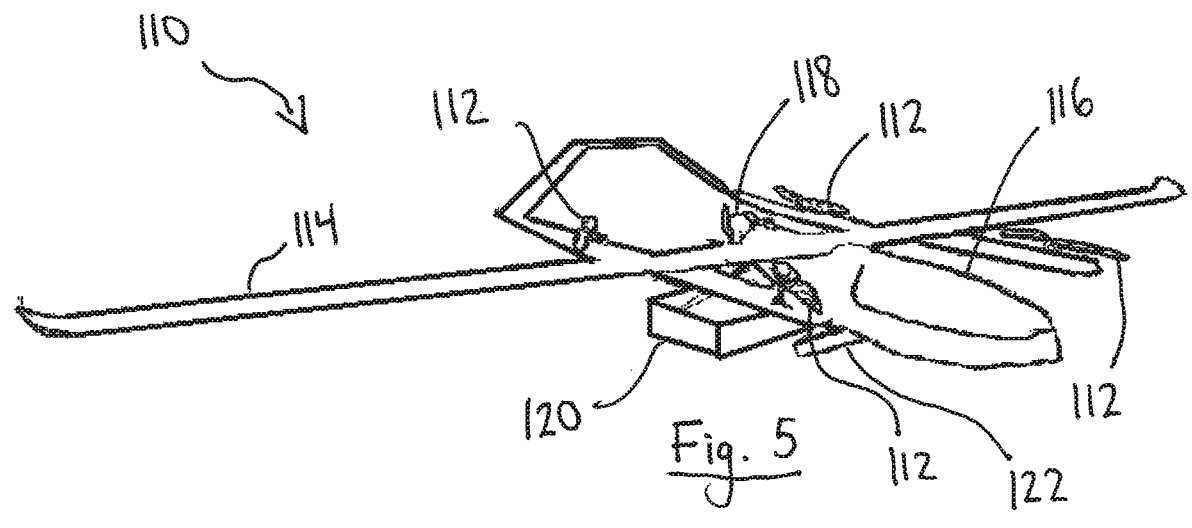
FIG. 5 is a simplified view of an embodiment of an unmanned aerial vehicle.
Figure 6:
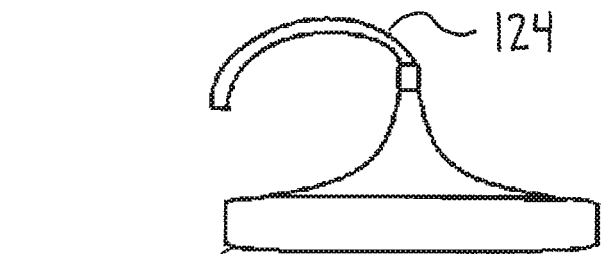
FIG. 6 is a schematic view of a funnel scoop for directing air for sampling.
Figure 7:
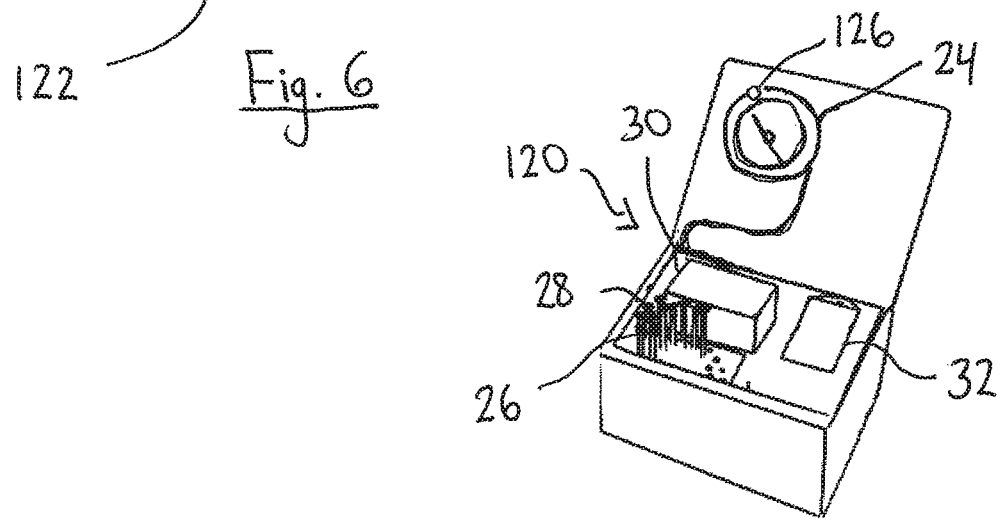
FIG. 7 is partial perspective view of an embodiment of a sequential sampling tracer unit.

FIGS. 5-7 show another embodiment of an unmanned aerial vehicle 110. The general principle of operation of the unmanned aerial vehicle 110 in the embodiment in FIGS. 5-7 is the same as in the embodiment shown in FIGS. 1-4. The unmanned aerial vehicle 110 has a fixed wing 114 attached to a body 116. Various different designs of unmanned aerial vehicles with various types of propulsion systems can be used. In this embodiment, there are four propellers 112 that allow the unmanned aerial vehicle 110 to be raised into the air prior to being driven with a propeller (not shown) on the back of the body 116 that provides forward thrust. A control unit 118 is present on the back of the vehicle 110. The unmanned aerial vehicle 110 may be for example a drone manufactured by Pegasus Imagery currently in Nisku, Alberta.

A sequential sampling tracer unit 120 may be connected to the body 116 of the vehicle 110. A funnel scooping method using a funnel scoop 122 may be used to direct air through the tracer unit 120 as the vehicle 110 is propelled through the air. A simplified drawing of the funnel scoop 122 is shown in FIG. 6. Various shapes of funnel scoops may be used. Preferably, the funnel scoop 122 may be elongated with a wider base than its height so that air can be directed through the funnel and into the tracer unit without substantially increasing drag on the vehicle 110. In some embodiments, the funnel scoop may be more than four times as wide as it is high. The funnel is connected to the tracer unit 120 using a hose 124. The tracer unit 120 may be placed directly behind the funnel so that drag is minimized. Various drag reducing elements (not shown) may be used to increase the aerodynamic design of the system. In some embodiments the tracer unit 120 may be carried inside the body 116 of the vehicle 110. The funnel 122 may be attached to various different locations on the vehicle 110.

The sequential sampling tracer unit 120 shown in FIG. 7 is similar to the tracer unit 20 in FIG. 2 except that it does not include the fan 22, but instead has an opening 126 for connecting to the hose 124 of the funnel 122. The opening 126 may also be placed in another location on the tracer unit and connected to the tubes by a connection such as an additional hose.

A fixed wing version of the unmanned aerial vehicle 110 may in some embodiments have a longer flying time than a multi-rotor driven drone as shown in FIG. 1. The fixed wing drone may also have a faster flying speed, which may increase the area that can be sampled. A controller may be able to control the unmanned aerial vehicle 110 from a distance of up to 100 kilometers, and possibly more depending on the technology used to control the vehicle. The controller may follow the drone during its operation, for example, in a vehicle. The drone may be controlled by a human operator, or it may be controlled by a processor either on the drone or separate from the drone. For example, the drone may be pre-programmed to follow the path of the pipeline using GPS information stored on the drone. Both the area of the funnel scoop 122 and the size of the hose 124 may be chosen to change the amount of air that passes through the tracer unit 120 for a set period of time or set distance. Experimental testing which varied the speed, area of the funnel scoop opening and hose diameter have indicated that hose size and distance travelled are the more significant variables to determine the amount of air that will pass through the hose 124 into the tracer unit 120 than funnel scoop size. The timing of sequential opening of the tubes 26 may be calculated based on variables such as flight speed, funnel scoop size and hose size.

The drone may be flown within a volume around the contained system such as a pipeline being inspected. The volume for example may be defined by a radius centered on the pipeline. The radius within which the drone may need to be flown may depend on the type of tracer being detected and other factors such as wind speed and other weather conditions. In some cases, the drone will need to be flown within a radius of 1000 m from the location of the contained system. In other cases, the dome radius may be smaller than 1000 m, such as 1300 feet, 765 feet, 365 feet or 170 feet. Preferably, in some embodiments, the drones may be flown in a volume having a radius about 200 to 300 feet from the contained system. In general, the closer that the drone flies to the contained system, the more accurate the results. In some cases, it may not be possible to fly the drone in close proximity to the contained system due to challenges such as rugged terrain or dense forests. The drone may need to be flown downstream of the pipeline if there is a significant wind in one direction. In some embodiments, the flight path of the drone may be a corkscrew shape within the radius in order to sample various different areas as the drone flies. Various different flights paths and shapes are possible.

In some embodiments, the aerial drone may be powered by a source other than electricity, such as gasoline. The tracer unit may have power provided to it through a generator which is connected to the engine of the drone.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method of testing for leaks in a contained system with an interior containing fluid, the method comprising:
    introducing a tracer gas into the interior;
    sensing for the presence of the tracer gas outside the contained system using a plurality of sensors located on an unmanned aerial vehicle, in which multiple of the plurality of sensors are opened sequentially as the plurality of sensors are transported on the unmanned aerial vehicle in proximity to the contained system;
    recording, with a processor, a location of the unmanned aerial vehicle when each of the multiple of the plurality of sensors are opened in the sequence; and
    determining whether tracer gas is detected in one or more of the multiple of the plurality of sensors, and, if tracer gas is detected in one or more sensors, determining one or more locations of a suspected leak in the contained system based on the recorded location or locations of the unmanned aerial vehicle when the one or more sensors within which tracer gas was detected were opened.

2. The method of claim 1 in which the plurality of sensors are a plurality of tubes, each tube containing an absorbent material which is capable of absorbing the tracer gas.

3. The method of claim 2 further comprising a vacuum pump for drawing air through each of the plurality of tubes sequentially.

4. The method of claim 2 further comprising a funnel scoop for drawing air through each of the plurality of tubes.

5. The method of claim 4 in which the funnel scoop has a width and a height and the funnel scoop is elongated with the width being greater than the height.

6. The method of claim 1 in which the unmanned aerial vehicle includes a radio navigation service receiver.

7. The method of claim 1 in which the contained system is a pipeline.

8. A leak detection apparatus for a contained system, comprising:
    an unmanned aerial vehicle;
    a sequential sampling tracer unit containing a plurality of tubes mounted on the unmanned aerial vehicle and a motor configured to open multiple of the plurality of the tubes sequentially;
    in which the plurality of tubes includes an absorbent material which is capable of absorbing a tracer gas; and
    one or more processors configured to:
        record a location of the unmanned aerial vehicle when each of the multiple of the plurality of tubes are opened in the sequence as the plurality of sensors are transported on the unmanned aerial vehicle in proximity to the contained system; and
        determine whether tracer gas is detected in one or more of the multiple of the plurality of sensors, and, if tracer gas is detected in one or more sensors, determining one or more locations of a suspected leak in the contained system based on the recorded location or locations of the unmanned aerial vehicle when the one or more sensors within which tracer gas was detected were opened.

9. The leak detection apparatus for a contained system of claim 8 further comprising a vacuum pump for drawing air through each of the plurality of tubes sequentially.

10. The leak detection apparatus for a contained system of claim 8 further comprising a funnel scoop for drawing air through each of the plurality of tubes sequentially.

11. The leak detection apparatus for a contained system of claim 10 in which the funnel scoop has a width and a height and the funnel scoop is elongated with the width being greater than the height.

12. The leak detection apparatus for a contained system of claim 8 further comprising a radio navigation service receiver mounted on the unmanned aerial vehicle.

* * * * *